(12) United States Patent
Dunn

(10) Patent No.: US 8,324,588 B2
(45) Date of Patent: Dec. 4, 2012

(54) REMOTE SUBSTANCE DETECTION

(75) Inventor: William L. Dunn, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 1070 days.

(21) Appl. No.: 12/209,063

(22) Filed: Sep. 11, 2008

(65) Prior Publication Data

US 2012/0037811 A1    Feb. 16, 2012

Related U.S. Application Data

(60) Provisional application No. 60/971,429, filed on Sep. 11, 2007.

(51) Int. Cl.
*G01T 1/00* (2006.01)
(52) U.S. Cl. .................................. 250/390.04
(58) Field of Classification Search .............. 250/390.04
See application file for complete search history.

(56) References Cited

U.S. PATENT DOCUMENTS 5,153,439 A * 10/1992 Gozani et al. ............. 250/390.04
6,157,699 A * 12/2000 Dunn ............................. 378/58

OTHER PUBLICATIONS

Dunn Flaw detection by X-ray scanning using the rolling-window template-matching procedure, Applied Radiation and Isotopes vol. 61, No. 6 (Dec. 2004), pp. 1217-1225.*
Dunn et al. Ionizing photon methods for standoff bomb detection, Nuclear Instruments and Methods in Physics Research A vol. 580, No. 1 (May 2007), pp. 778-781.*

* cited by examiner

*Primary Examiner* — David Porta
*Assistant Examiner* — Shun Lee
(74) *Attorney, Agent, or Firm* — Schwegman Lundberg & Woessner, P.A.

(57) ABSTRACT

A detection system and methods are described for determining whether a target contains a selected substance or device such as an explosive device, illegal drugs, dangerous chemicals, or the like. According to some embodiments, a detection system is comprising a radiation source and one or more detectors. The detection system in this directs radiation from a distance and towards a target suspected to contain a dangerous device or substance. A response is detected from the target. The response is compared to one or more templates that represent known explosives, drugs, dangerous chemicals, or the like. A score may be generated that corresponds to a similarity between the targeted and known substances. When the score indicates that the target substance is likely to be dangerous or contraband, then an alarm or other indication may be generated in some embodiments.

15 Claims, 4 Drawing Sheets

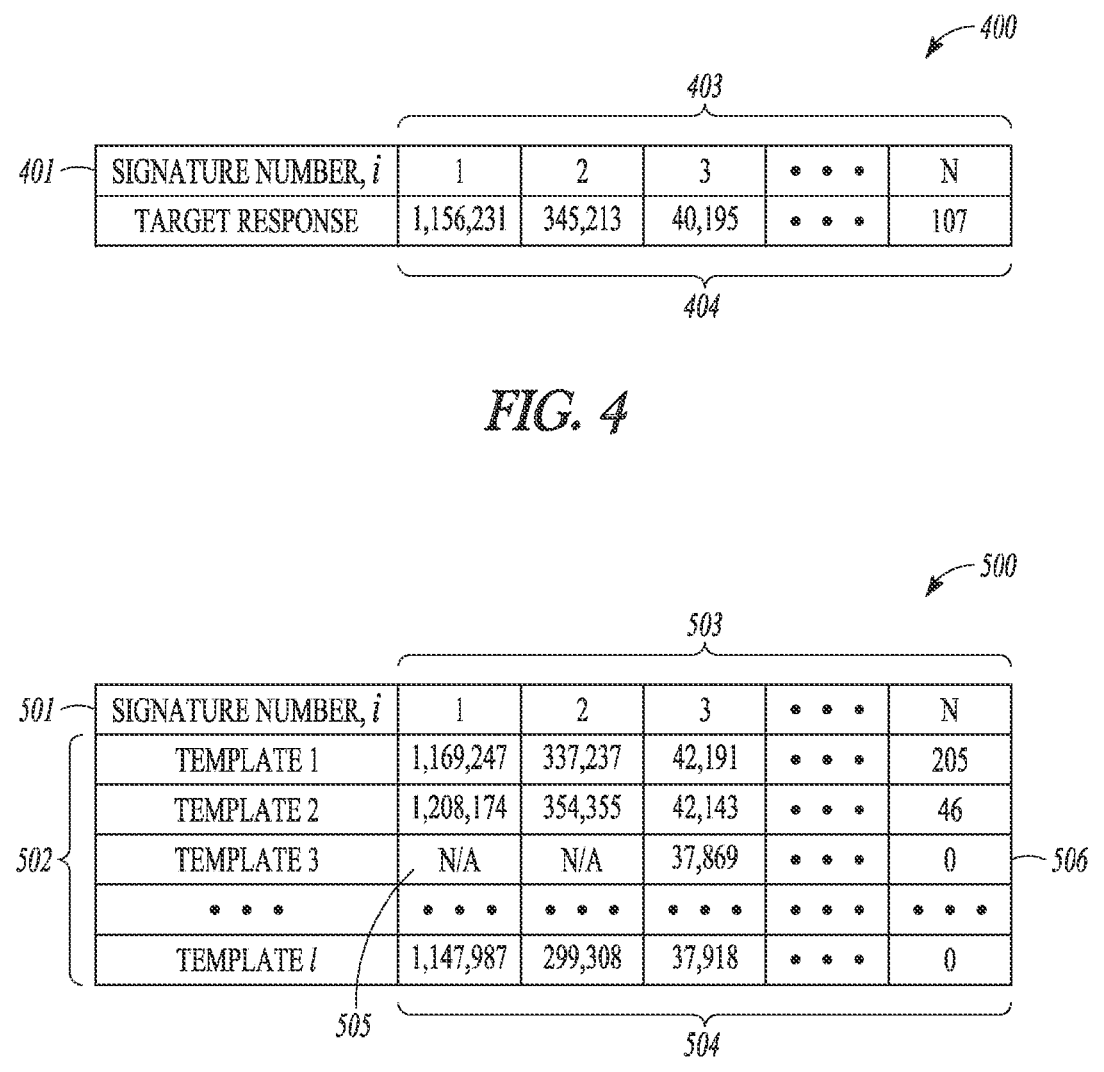

| SIGNATURE NUMBER, i | 1 | 2 | 3 | • • • | N |
|---|---|---|---|---|---|
| TARGET RESPONSE | 1,156,231 | 345,213 | 40,195 | • • • | 107 |

FIG. 4

| SIGNATURE NUMBER, i | 1 | 2 | 3 | • • • | N |
|---|---|---|---|---|---|
| TEMPLATE 1 | 1,169,247 | 337,237 | 42,191 | • • • | 205 |
| TEMPLATE 2 | 1,208,174 | 354,355 | 42,143 | • • • | 46 |
| TEMPLATE 3 | N/A | N/A | 37,869 | • • • | 0 |
| • • • | • • • | • • • | • • • | • • • | • • • |
| TEMPLATE l | 1,147,987 | 299,308 | 37,918 | • • • | 0 |

FIG. 5

REMOTE SUBSTANCE DETECTION

RELATED APPLICATION

This application claims priority to U.S. Provisional Application Ser. No. 60/971,429 (entitled REMOTE SUBSTANCE DETECTION, filed Sep. 11, 2007), which is incorporated herein by reference.

GOVERNMENT FUNDING

This invention was made with Government support under Grant Number M67854-02-D-1110 awarded by the United States Marine Corps Systems Command. The United States Government has certain rights in the invention.

BACKGROUND

The use of explosive or otherwise dangerous devices by terrorists and criminals is an increasing threat. For example, the use of improvised explosive devices (IEDs) by terrorists continues to threaten both civilians and U.S. military personnel in Iraq. As of March 2008, approximately 1,650 U.S. casualties had been reported from IEDs, and a total number of 4,000 casualties had been reached in Iraq. Threats also exist in common portals such as airports, seaports, transit stations, and the like.

Current methods of detection fail to adequately and safely identify or disable IEDs and other dangerous materials. For example, signal jamming is currently an often used technology in Iraq. Signal jamming may effectively disable an IED in some cases. However, signal jamming attacks the user and not the device itself, and terrorists are adapting IEDs to avoid signal jamming techniques.

Other solutions including residual chemical analysis may be used to determine the presence or use of explosive materials. However, close contact is required with the target. Often such contact may be dangerous and undesired.

Another solution has been to use neutron or photon imaging techniques. Such techniques may require a significant amount of resources. This may include the necessity for devices that produce images with very high spatial resolution, along with the requirement that human operators be trained to interpret the images. Even with training, human operators are prone to making mistakes in identifying certain objects as threats.

BRIEF DESCRIPTION OF THE DRAWINGS

FIG. 4 is a table illustrating a data structure of a target response according to one embodiment.

FIG. 5 is a table illustrating a data structure of a template library according to one embodiment.

DETAILED DESCRIPTION

Figure 1:
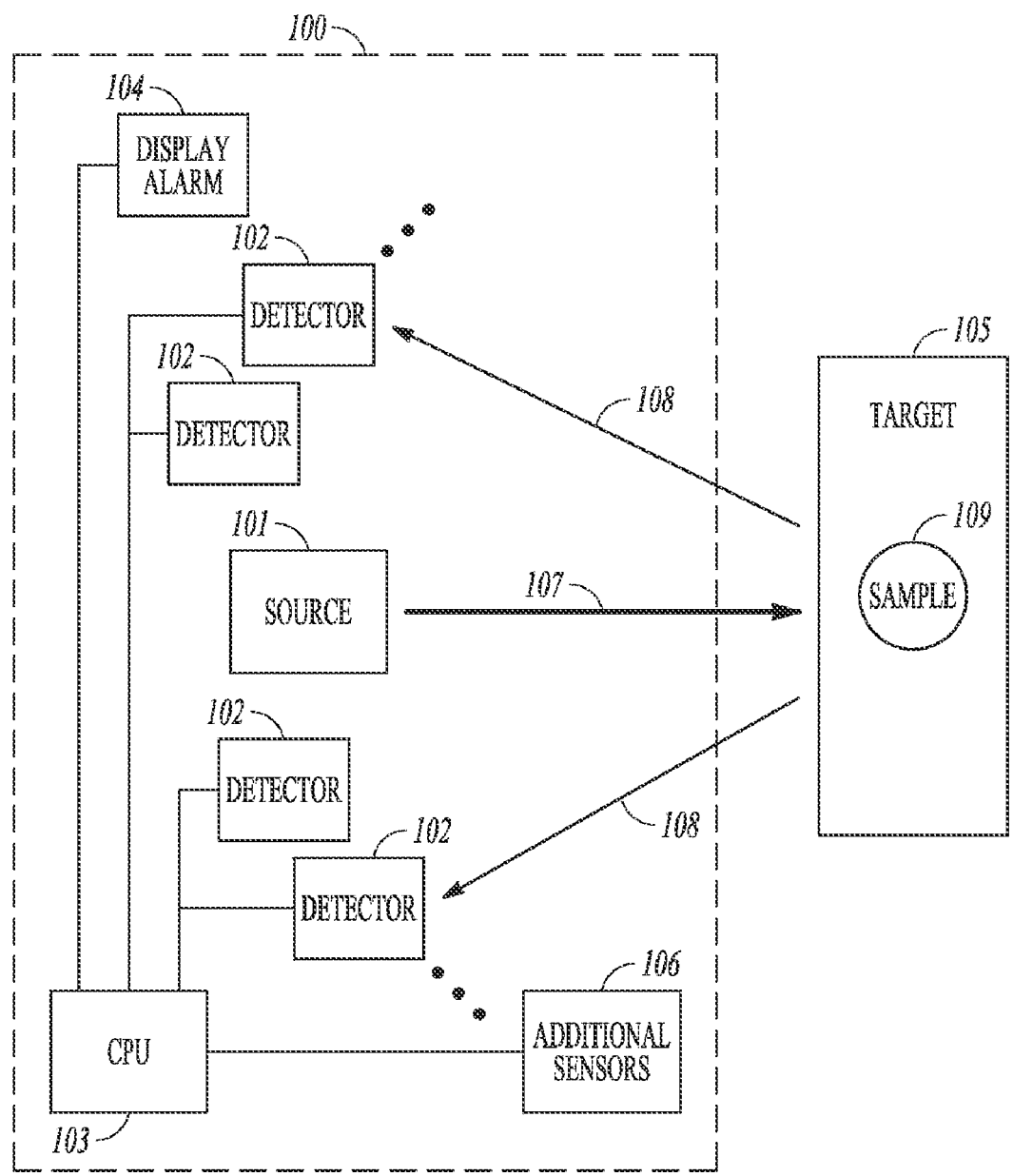
FIG. 1 is a block diagram illustrating components of a detection system according to one embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A solution is needed that defeats the device from a distance, and does so without requiring undue processing time or difficult human interpretation of the results. Accordingly, systems and methods are described herein that allow the detection of dangerous materials or other specific substances from a distance. Furthermore, according to certain embodiments the systems described require relatively little in the way of processing power or human interpretation.

Furthermore, the need for inspection is not limited to explosive devices. The current state of the art for inspecting and identifying the contents of targets in general is slow, imprecise and risky, often requiring personal inspection. There is a need for a system and method capable of remotely identifying the content and composition of materials that are carried or hidden in a package or container. For example, this technology could be used at portals, such as airports, seaports, train and subway stations to interrogate cars, trucks, cargo containers, suitcases, and the like to determine if they contain explosives, illegal drugs, contraband or other specific materials or substances that may be of interest.

Methods and systems are described for nondestructive analysis and more particularly to detection of material types when the materials or substances are hidden in an object, which is referred to as a "target." In various embodiments, the presence of some condition is detected based on matching a measured response to a template. The presence of the condition may be indicated if the template is matched and a figure-of-merit representative of the difference between the substances is small. In some embodiments, nuclear technologies of neutron and photon interrogation using template-matching techniques are utilized. The method of such interrogations may be referred to as a signature-based radiation scanning ("SBRS") method.

Several advantages may be provided by one or more embodiments of the SBRS technique. For example, the technique seeks detection, not measurement. This simplifies the process, allowing it to be performed quickly. In some embodiments, a simple "yes/no/maybe" result is provided on the basis of two metrics, a figure-of-merit and the standard deviation of the figure-of-merit. New signatures can be added to the procedure as they become available. While signatures from radiation interrogation are discussed herein, in some embodiments other signatures easily can be incorporated.

The effects of clutter can be reduced according to certain embodiments because all that needs to be determined is if the signatures for a given interrogated volume match sufficiently closely any template characteristic of an explosive material or other substance being in that volume. This approach may significantly simplify the detection of IEDs because it avoids nonlinear inversion of radiation-based measurements.

Signatures are also relatively easy to measure with readily available equipment. Detection may be based on redundant and complementary interrogation involving both neutron and photon interrogation. Interrogation devices can be operated remotely, so no human operator need be near the sensing device or the target. All components may operate at standoff distances of a meter or more.

The SBRS technology provides solutions to highly nonlinear analysis problems by signature analysis using template matching rather than by complex and detailed inverse analysis. The SBRS technology may significantly reduce the amount of data necessary, thereby simplifying the interrogation process. In some embodiments, photon and neutron interrogation procedures may be blended into a robust combination that provides more information than either independently.

There are several practical applications of the SBRS technology which can be used to detect many different substances or combinations of substances. First, it may be used to remotely identify improvised explosive devices (IEDs). Second, the technology can be used at portals—such as airports, seaports, train and subway stations, etc.—to interrogate cars, trucks, cargo containers, suitcases, back-packs, and other targets to determine if they contain explosives, illegal drugs, or other specific materials or substances that may be of interest. Third, the technology is potentially applicable to detection of landmines and buried ordnance that is unexploded. More generally, the technology can be used to interrogate targets for contraband of any type. For instance, the technology might be useful to detect whether miners are hiding diamonds, gold, or other specific materials in satchels or other packages. It should be noted that in some embodiments, the technology is not recommended for routine interrogation of personnel directly, as ionizing radiation has the potential to be harmful.

A more detailed explanation of the structure and function of one embodiment of a remote substance detection system will be described with reference to the figures.

FIG. 1 shows a detection system 100 according to certain embodiments. The detection system 100 may be used, for example, to determine whether the target 105 contains a dangerous or explosive substance. For example, the target 105 may be the trunk of a vehicle which is suspected to contain a sample 109 that may be an explosive substance or device. The target 105 may comprise, for example, the trunk of a car, a back-pack, luggage, a purse, a briefcase, a barrel, or the like. The sample 109 may comprise a substance, device, or container that may be dangerous or illegal. In some embodiments, the sample 109 is also the target 105. In other embodiments, the sample 109 is contained within the target 105.

The detection system 100 may then be used to determine a likelihood that the target 105 contains a sample 109 that may be, for example, dangerous or illegal while at a distance from the target 105. In general, being able to determine whether the target 105 is dangerous at a greater distance will increase the likelihood that the dangerous target 105 can be disarmed or disposed of without injury.

The detection system comprises a radiation source 101. The radiation source 101 may comprise, for example, a photon source, a neutron source, or both. In some embodiments, the radiation source 101 may comprise multiple radiation emitting devices. In one embodiment, the radiation source comprises at D-T generator. In other embodiments, the radiation source 101 may comprise a radioisotope emitter or an x-ray emitter. The radiation source 101 may be shielded and comprise a collimator in order to direct emitted radiation 107 in an approximate path.

The radiation source 101 emits radiation 107, for example photons or neutrons. The radiation 107 may be directed towards the target 105. As mentioned above, the target 105 may contain a sample 109 that comprises an unknown object or substance. In certain embodiments, the target 105 may be an object or substance of varying size. For example, the target 105 may be the size of a car trunk or a truck bed. In other embodiments, the target 105 may be approximately one-quart in volume. The sample 109 may also vary in size. For example, the sample 109 may have a volume of approximately fifteen gallons. In other embodiments, the sample 109 may be smaller than one gallon. In some embodiments, the sample 109 is smaller than the target 105. In some embodiments the sample 109 is approximately the same size as the target 105. As will be described in greater detail below, the detection system 100 may be configured to account for variations in the size of the target 105, the size of the sample 109, and the configuration of the sample 109 and the target 105.

When the target 105 is bombarded with radiation 107, the target 105 emits high energy photons or gamma rays 108. The target 105 may also emit neutrons 108. The back-streaming photons and/or neutrons 108 comprise varying energy levels corresponding to the density and composition of the target 105.

Certain compounds and elements are known to emit gamma rays and neutrons of certain energies when exposed to radiation. Hydrogen, carbon, nitrogen, and oxygen may emit photons at a number of different energy levels. For example, nitrogen may emit photons at characteristic energy levels of 2.313 MeV and 4.914 MeV.

Furthermore, certain types of targets are known to comprise approximate levels of different elements. For example, common nitrogen-rich explosives such as PETN, NTO, and TNT have characteristic levels of hydrogen (approximately 3%), carbon (approximately 20%), nitrogen (approximately 31%), and oxygen (approximately 46%). These substances emit photons at energy levels and in proportion corresponding to their composition. The target 105 also emits back-streaming photons and neutrons 108 corresponding to its composition and arrangement.

The back-streaming photons and neutrons 108 are sensed by one or more detectors 102. As shown in FIG. 1, four detectors 102 are used. However, in other embodiments only one detector is used. In still other embodiments any number of detectors are used. More detectors may be used when varying types of detectors may be useful, when detectors are desired in multiple locations, or for some other reason. For example, a first detector 102 may be sensitive to energy levels in a certain spectrum, and a second detector 102 may be sensitive to energy levels in another spectrum that may or may not coincide with all or portions of the first spectrum.

The detectors 102 count the number of back-streaming photons 108 and may detect their energies; in addition some detectors may detect back-streaming neutrons. For example, a detector 102 may comprise a scintillation spectrometer to measure the number of back-streaming photons detected at each of a wide range of energy levels. Alternatively, a detector 102 may comprise a high purity germanium detector and measure the spectrum of back-streaming photons over a wide range of energies. In another embodiment, a detector 102 may detect back-streaming neutrons over a wide range of energies.

The detectors 102 generate signals indicative of the detected gamma rays and/or neutrons 108 and transmit those signals to a computing device 103. The computing device 103 comprises at least a processor and a memory. The memory stores a library of templates in some embodiments. Each template corresponds to a target containing a sample of a known substance. For example, a number of templates corresponding to targets containing explosive or dangerous substances may be stored in the library. In some embodiments, a number of templates correspond to targets containing other substances such as illegal drugs. In certain embodiments, templates are stored not only for targets containing different substances, but also for different configurations of the target and substance. For example, a template may be stored corresponding to an explosive fertilizer compound located in a near location of an automobile trunk, and another template may be stored corresponding to the same explosive fertilizer compound being located at a far location of an automobile trunk.

The computing device 103 compares the signals generated by the detectors 102 to the templates. Based on that comparison, the computing device 103 determines a likelihood that the target 105 contains a substance similar or identical to one of the substances represented by the templates.

The computing device 103 may also comprise one or more input means. In some embodiments, task specific buttons or switches may be provided. For example, a trigger or button may be provided to activate the detection process. In other embodiments, a keyboard and mouse, or some other computing interface, may be connected to the computing device 103.

The detection system 100 comprises a display 104 in the embodiment shown. The display 104 may comprise a monitor or the like, and may comprise additionally or alternatively an alarm. The alarm may be a visible alarm such as a flashing light, a red-yellow-green light system, or the like. The alarm may also comprise an audible alarm that generates tones or phrases. The display 104 may be used by an operator to obtain information from the detection system 100 including but not limited to an assessment of the danger associated with the target 105, operating performance and settings, visual images of the target 105, template information, and the like.

The detection system 100 further comprises additional sensors 106. A single additional sensor 106 is shown in FIG. 1, but any number of additional sensors 106 may be utilized. The additional sensor 106 may comprise, for example, a weight scale. In some embodiments, the additional sensor 106 comprises an input port that allows the connection of one or more external sensors. External sensors may provide additional signatures or information, such as a range to the target and the ambient humidity. These additional signatures or information may be used, for example, to select an appropriate subset of templates from the template library.

The components of the detection system 100 are shown as a single device in the block diagram of FIG. 1. However, in other embodiments the components of the detection system 100 are separate devices and may be connected via wired or wireless communication systems. For example, a single unit including the source 101, detectors 102, the computing device 103, and a display 104 may be mounted on or in a vehicle. In another embodiment, the source 101 and the detectors 102 are a single unit used in an airport security setting, while the computing device 103 comprises a personal computer connected to the source 101 and detector 102 unit via a wired interface such as a USB interface. Using the methods described in more detail below, or a variation thereof, the detection system 100 may be useful in detecting and defeating explosive devices or the like.

Figure 2:
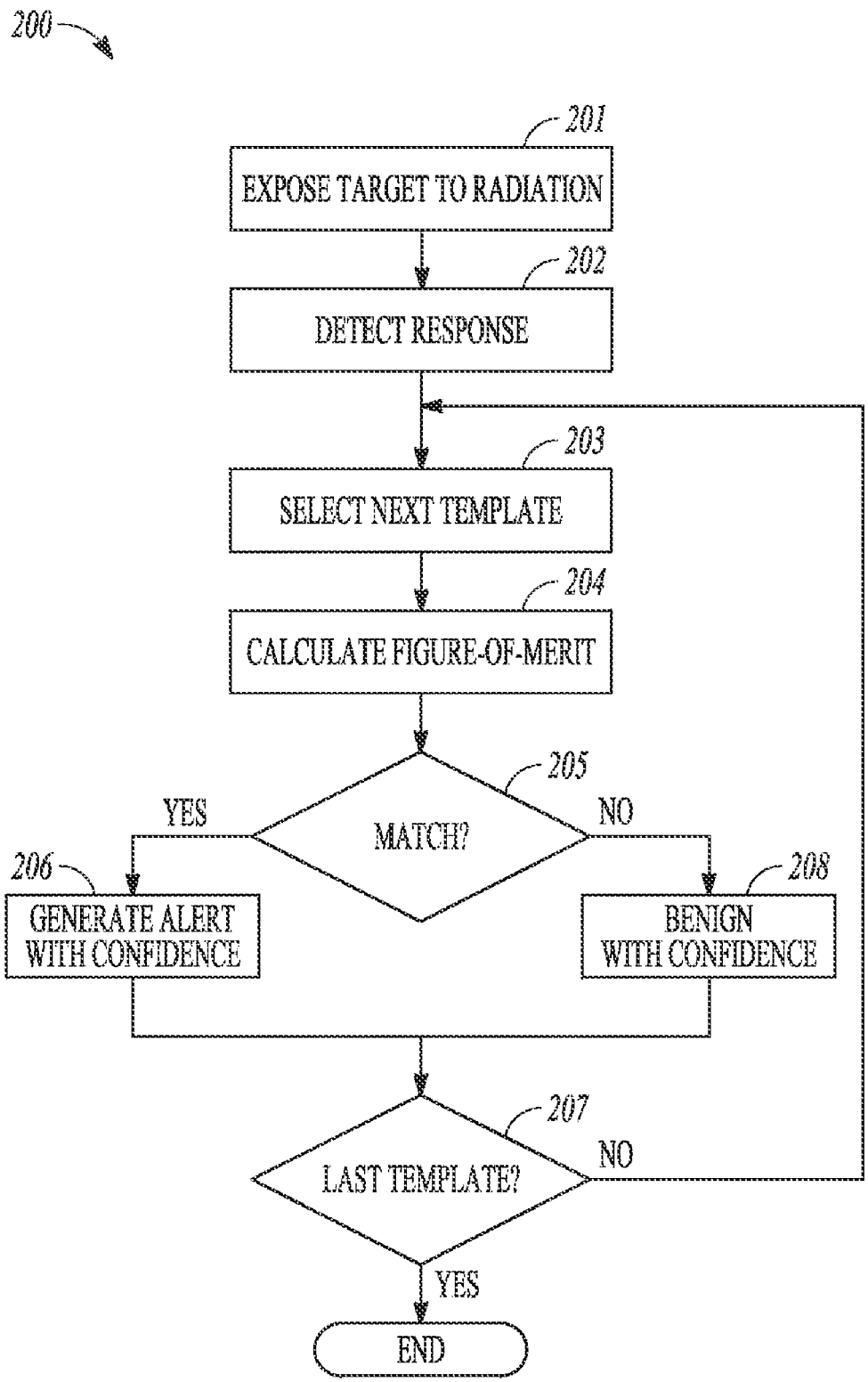
FIG. 2 is a flow chart illustrating a method for the remote detection of explosive substances according to one embodiment.

FIG. 2 shows a flow chart of a method 200 for determining whether a target 105 contains a sample 109 corresponding to a dangerous substance according to one embodiment. The method 200 will be described here with reference to the detection system 100 described above. However, other devices and configurations may be utilized to perform certain steps of the method 200. Additionally, the method 200 may be modified in certain embodiments by adding steps, removing steps, varying the order in which certain steps are performed, or the like.

The method 200 begins at the step 201 where the target 105 is exposed to radiation 107 for a length of time that may depend on the intensity of the source and the range to the target. Typical exposure times may be in the range of seconds to tens of seconds in some embodiments. For example, the detection system 100 may be aimed at a trunk of a car containing a target 105. Exposing the target 105 to radiation 107 causes the target 105 to emit gamma rays 108. Neutron interrogation of the target also causes the target to emit neutrons, which are also part of the radiation 108.

At the step 202 of the method 200, the detection system 100 detects the response of the target 105. Specifically, the detectors 102 of the detection system 100 measure the number of photons and neutrons 108 that are emitted and directed towards the detectors 102. The detectors 102 also measure the energy level of the detected photons 108. The detectors 102 generate a signal indicative of the detected photons and/or neutrons 108. That data may be stored in a memory of the detection system 100.

Each of the templates comprises one or more signatures for the corresponding known substance and/or target configuration that it represents. The signatures correspond to predicted or previously measured responses from the known substance at given energy levels. For example, when oxygen is exposed to radiation, it is known to emit photons at the 0.871 MeV energy level. Therefore, a 0.871 MeV oxygen capture signature may comprise a number of photons detected or expected to be detected near that energy level. A known substance corresponding to a template may therefore have a value for each signature, the value related to the composition of the substance.

Figure 3A:
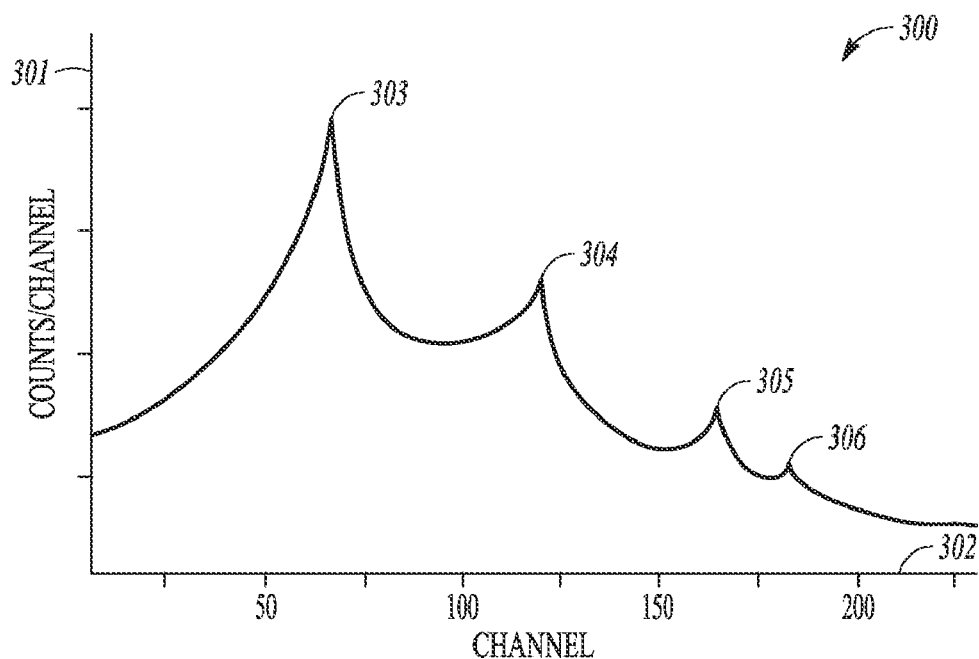
FIGS. 3A and B are plots illustrating a target response to radiation exposure according to one embodiment.
Figure 3B:
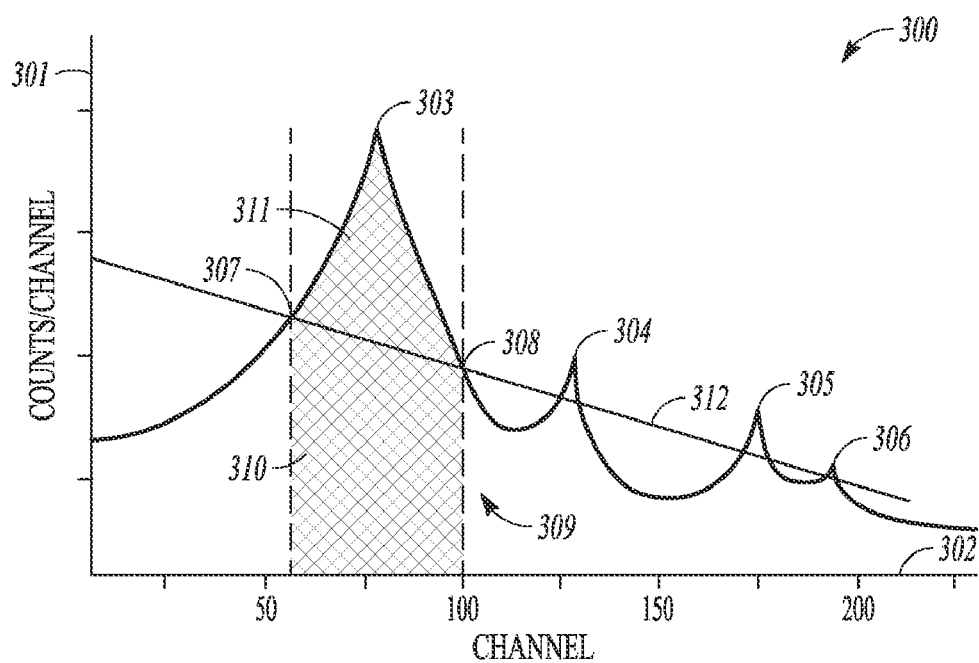

An example of how a specific signature might be determined from a detected response is shown in FIGS. 3A and 3B. FIG. 3A shows a plot of a detected response signal 300. The response signal 300 measures the counts per channel on one axis 301 against the channels on a second axis 302. The counts per channel correspond to the number of photons or neutrons detected within a particular channel, while the channels are proportional to the energy level.

The peaks 303, 304, 305, and 306 in the response signal 300 represent particular energy levels around which the signatures are centered. For example, the peak 303 may correspond to an energy level of 0.871 MeV. The peak 304 may correspond to a 1.262 MeV energy level associated with a carbon capture signature. The other peaks 305 and 306 may correspond to other energy levels and signatures. The response signal 300 in FIG. 3 is not drawn to scale and the peaks 303, 304, 305, and 306 may correspond to other energy levels in some embodiments.

FIG. 3B shows the response signal 300. In order to calculate a signature value for the peak 303, the response signal 300 is integrated between a first channel 307 and a second channel 308 in order to determine an area 309 corresponding to the counts or photons detected near the peak energy level 303. Standard peak-fitting algorithms may be used to identify the start channel 307, the stop channel 308, and the total counts 309 under the peak. In some embodiments, a background 310 is determined. The background may be determined by the total number of counts between the start channel 307 and the stop channel 308 that are under a baseline 312. The baseline 312 may be a line or curve that is fit to the response 300. In one embodiment, the background 310 is subtracted from the total counts 309 forming the net area 311 under the peak. In some embodiments, the net counts 311 may be determined by fitting a normally distributed curve to the response 300 over the baseline 312 and between the start channel 307 and the stop channel 308. For example, the normally distributed curve may be fit to the peak 303 alone based on the maximum height and the width at half maximum. In other embodiments, other methods can be used to determine the total counts 309 or the net counts 311. Thus, either the total counts 309 or the net counts 311 comprises a given signature for peak 303. One signature is shown in FIG. 3B, but signatures may be calculated at the other peaks as well. In addition, even though the response signal 300 may not have a peak at a particular energy level, a signature may still be calculated. In this case, the relatively low signature value may represent a relatively small quantity of a particular element being present, or it may represent a low detection probability for that energy level, or it may be due to some other cause.

FIG. 4 shows an example of data table 400 comprising information indicative of a detected response from a target 105. The data table 400 comprises a first row 401 having several signature numbers 403.

In this case, the signature numbers 403 are numerically ordered from 1 to N, where N is a positive integer corresponding to the total number of signatures. Each signature number corresponds with a particular signature. For example, signature 1 may correspond with a photon response between 75 and 250 keV, signature 2 may correspond with a 3.378 MeV Nitrogen inelastic scatter gamma-ray signature, and other signatures may correspond with signatures 3 through N. In other embodiments other signatures may correspond to any of signatures 1 through N.

Each signature number 403 corresponds with a signature value 404 in the data table 400. The signature value 404 is the value determined by counting the detected photons and/or neutrons 108 from the target 105 near the energy level associated with that signature as described above. In the data table 400, these signature values are: 1,156,231 for signature 1; 345,213 for signature 2, 40,195 for signature 3, and 107 for signature N. Other signatures and values are not shown.

At the step 203 of the method 200, a template is selected from a stored library. Each template corresponds to a substance or combination of substances. In certain embodiments, the templates stored in the library correspond to explosive substances. In some embodiments, the templates stored in the library correspond to one or more of drugs, contraband, dangerous or regulated chemicals, or the like.

FIG. 5 shows a data table 500 that may represent a library of templates 502. The data table 500 comprises a first row 501 having a number of signature numbers 503 that correspond to the same signature numbers for the detected response data table 400 shown in FIG. 4.

The other rows of data table 500 comprise templates 502 and the corresponding signature values 504. The data table 502 comprises one or more templates 502, and is shown with four templates 502. In other embodiments there are many templates, with l being any positive integer that identifies one template from among the many. The signature values 504 may be determined, for example, by using the detection system 100 on a known substance. In other embodiments, known templates are added electronically to the data table 500.

In addition to cells of the data table 500 having values shown, the data cell 505 corresponding to template 3 and signature 1 is labeled "n/a." This may be the case where a data value is not available for a given substance and signature. According to some embodiments, the methods described herein may be modified so that signatures that have no data are not used in determining how similar the target 105 is to the template substance. The data cell 506 shown has a value of zero. In some embodiments a signature may have any non-negative value, including zero.

Returning now to the method 200 of FIG. 2, a template may be selected at the step 203. For example, template 1 may be selected. Template 1 as shown in FIG. 5 has these signatures values: 1,169,247 for signature 1; 337,237 for signature 2; 42,191 for signature 3; and 205 for signature N. Other signatures and values are not shown.

At step 204 of the method 200, a figure-of-merit is calculated. A figure-of-merit may be calculated by comparing the signature values of the detected response to the signature values of the selected template. In some embodiments, the figure-of-merit is calculated according to the following equation:

$$\zeta_l = \sum_{i=1}^{N} \alpha_i \frac{(\beta R_i - S_{li})^2}{\beta^2 \sigma^2(R_i) + \sigma^2(S_{li})} \quad (1)$$

where $\zeta_l$ is the figure-of-merit for the unknown target using the lth template, $R_i$ is the ith signature of the target, $S_{li}$ is the ith signature or template value for the lth template, N is the number of signatures, $\beta$ comprises a scaling factor, $\sigma^2$ is the variance, and $\alpha_i$ comprises a normalized weight factor given by:

$$\alpha_i = \frac{w_i}{\sum_{i=1}^{N} w_i}, \quad (2)$$

where $w_i$ comprises a positive weight for the ith signature.

Substances having similar compositions will have similar signatures. For these substances, the figure-of-merit is expected to be relatively small. However, the signature value of the target 105 may be affected by environmental and target conditions. The scaling factor $\beta$ may be adjusted when the conditions under which the target 105 is analyzed are different than the conditions used to generate the template. For example, when the sample 105 is smaller than the sample used to generate the template, when the target 105 is further from the source 101 and the detectors 102, when the exposure time on the sample is lower than the exposure time used to generate the template, or under other conditions, the scaling factor $\beta$ may be used to compensate for an expected lower signature value. In this case the scaling factor $\beta$ may be larger than 1.0. Under other conditions, the scaling factor $\beta$ may be equal to or less than 1.0. In some embodiments, the scaling factor $\beta$ is determined so as to minimize the figure-of-merit. In some embodiments, the scaling factor $\beta$ is based at least in part on data obtained by a sensor 106, such as an internal radiation dose or fluence indicator that indicates what actual radiation exposure the target received.

The weight factor may be used to emphasize certain signature value comparisons that are known to be correlated to deciding whether the sample 109 of the target 105 has a similar composition to the known substance corresponding to the template. For example, if it is determined that the signature value for signature 1 is highly correlated with the determination of whether the target 105 comprises an explosive device of the like, then the weight factor may be larger than for other signatures. The weight factor may also compensate for signatures having either relatively high or low count values across many substances.

At the step 205 of the method 200, the figure-of-merit may be used to determine whether the sample 109 of the target 105 has a composition that matches the composition of the known substance corresponding to the selected template. In some embodiments, a match is determined based on a threshold. For example, in a system wherein the templates correspond to explosive compounds, a figure-of-merit less than the threshold value may correspond to a likelihood that the target 105 contains an explosive substance.

The threshold value may be determined, for example, from experimental data. In some embodiments, the threshold value may be approximately 25.0. In other embodiments, the threshold value may be determined in part based upon the number of signatures. In some embodiments, the threshold value is specific to a particular template.

If the figure-of-merit is less than the threshold value, then a match is determined at the decision state 205 and the method 200 proceeds to the step 206 where a confidence value is determined. A confidence value may be determined in some embodiments using a filter function. In some embodiments, the following equation is a positive filter function:

$$f_+(\lambda) = \zeta_l + \lambda \sigma(\zeta_l) \quad (3)$$

where $f_+$ is the filter function value, $\zeta_l$ comprises the figure-of-merit for the lth template, $\sigma$ is the standard deviation of the figure-of-merit, given by:

$$\sigma(\zeta_l) = 2\left[\sum_{i=1}^{N} \alpha_i^2 \frac{(\beta R_i - S_{li})^2}{\beta^2 \sigma^2(R_i) + \sigma^2(S_{li})}\right]^{1/2} \quad (4)$$

where all quantities are as identified previously for the figure-of-merit, and $\lambda$ corresponds to a confidence level. The calculated filter function value may be compared to the threshold value. If the filter function value is less than the threshold value, then there is a likelihood corresponding to $\lambda$ that the target 105 is comprised of a sample 109 similar to the template substance.

The value of $\lambda$ represents the number of standard deviations between the figure-of-merit and the threshold value. Thus, the larger the value of $\lambda$ the more confidence in the result.

The positive filter function may also be expressed as:

$$\lambda = \frac{f_0 - \zeta_l}{\sigma(\zeta_l)} \quad (5)$$

where $\zeta_l$ is the figure-of-merit, for the lth template, $f_0$ is the threshold value, $\sigma$ is the standard deviation, and $\lambda$ corresponds to the confidence level. The value of $\lambda$ is associated with an approximate likelihood that the measured substance and the known substance corresponding to the template are similar.

The determined confidence value may be displayed in some manner depending on settings chosen, the confidence value itself, or the like. In some embodiments, an alarm is displayed on the display 104 of the detection system 100 anytime the figure-of-merit is less than the predetermined threshold value for a template corresponding to an explosive substance. In other embodiments, an alarm is generated only when the positive filter function is less than the cut-off value (that is, $f_+(\lambda) < f_0$) for a given value of $\lambda$. In other embodiments, an alarm is generated only if the confidence parameter $\lambda$ is greater than a certain value, such as unity. In some embodiments, a first indication is given that the target 105 is likely an explosive substance when the figure-of-merit is less than the threshold value, and a second indication is generated by the display 104 indicating the certainty or confidence. For example, the first indication may comprise a red light and the second indication may comprise a numerical readout showing a percentage value corresponding to the confidence. In still other embodiments, the alert may comprise an audible alarm. While the above examples discuss explosives, similar methods may be applied to detecting and generating alerts for other substances such as drugs, dangerous chemicals, or the like.

Next, the method 200 proceeds to the decision state 207. At the decision state 207 it is determined whether the selected template is the last template. In an example above, the selected template was template 1 of the library data table 500. Additional templates remain in this example, and so the method 200 returns to the step 203 where the next template is selected. For example, template 2 from the data table 500 may be selected. Once the last template has been compared with the response from the target 105, the method 200 may end. In some embodiments, the last template may comprise the last template of a subset corresponding to one or more types of substances.

Returning now to the decision state 205, an embodiment has already been explained for the case that there is a match as determined by the figure-of-merit and a threshold value. Alternatively, if the figure-of-merit is greater than a threshold value, then the process 200 may proceed to the step 208.

At the step 208 a filter function may be applied to determine a confidence level associated with the composition of the target 105 being different from the substance corresponding to the selected template. In the case where the templates correspond to explosive substances, the confidence level determined at the step 208 may correspond to a confidence level that the target 105 is benign. In some embodiments, the following negative filter function may be used:

$$f_-(\lambda) = \zeta_l - \lambda \sigma(\zeta_l) \quad (6)$$

where $f_-$ is the filter function value, $\zeta_l$ comprises the figure-of-merit for the lth template, $\sigma$ is the standard deviation, and $\lambda$ corresponds to a confidence level. As with the positive filter function, the negative filter function value may be compared to the threshold value. If the filter function value is greater than the threshold value, then there is a likelihood corresponding to $\lambda$ that the target 105 contains a sample 109 comprising a substance distinct from the template substance. As described above with respect to the positive filter function, the value of $\lambda$ represents the number of standard deviations between the figure-of-merit and the threshold value and may be correlated to a percentage certainty according to a known or estimated distribution of data. The negative filter function may also be expressed as:

$$\lambda = \frac{\zeta_l - f_0}{\sigma(\zeta_l)} \quad (7)$$

where $\zeta_l$ is the figure-of-merit, for the lth template, $f_0$ is the threshold value, $\sigma$ is the standard deviation, and $\lambda$ corresponds to the confidence level. Any value of $\lambda$ may be associated with a likelihood that the measured and known compounds are distinct.

The detection system 100 may generate an alarm in some embodiments indicating that the figure-of-merit is greater than the threshold value. In some embodiments, the detection system 100 may additionally or alternatively generate an alarm indicating the determined confidence that the measured substance is different from the template substance. For example, with a template corresponding to an explosive material, a green light may be activated or displayed by the display 104 when it is determined that the figure-of-merit is greater than the threshold value. The confidence value determined may be shown on the display 104. In some embodiments, a yellow light may be activated or displayed when neither of the conditions $f_+(\lambda) < f_0$ nor $f_-(\lambda) \geqq f_0$, for a given value of $\lambda$, is satisfied, indicating that the target cannot be determined to be either dangerous or inert to a confidence dependent on the value of $\lambda$. For example, a yellow light may be activated when for, $\lambda = 1$:

$$f_+(1) = \zeta + \sigma(\zeta) > f_0 \quad (8)$$

but also:

$$f_-(1) = \zeta - \sigma(\zeta) < f_0 \quad (9)$$

In still other embodiments, a numerical representation of the confidence level is shown on the display 104.

The process 200 continues to the decision state 207. As discussed above, it is determined if the selected template is the last template at the decision state 207. If additional templates remain to be analyzed, then the method 200 returns to the step 203 and the next template is selected. If the selected template is the last template the process 200 ends.

Because the process 200 may analyze a number of templates, a variety of different figures-of-merit and confidence levels may be determined. In some embodiments, at least one figure-of-merit will be greater than a threshold value and at least one figure-of-merit will be less than a threshold value. In this case the detection system 100 may generate a single alert corresponding to the highest confidence that the target 105 has a composition similar to that represented by one of the templates. Alternatively, the detection system 100 may generate representations of the figures-of-merit and confidence values for each of the templates. For example, a list or table may be generated on the display 104.

While one embodiment of the method 200 has been described, other variations are contemplated. In some other embodiments, certain steps may be modified or removed. For example, filter functions may not be calculated in some embodiments. In other embodiments, multiple figures-of-merit are computed substantially simultaneously. Certain embodiments may be contemplated even though not every advantage described expressly or implicitly herein may be present.

Examples of signatures that may be utilized have been given, but different signatures may be used as well. For example, signatures may comprise any combination of: a photon response between 75 and 250 keV, a 0.511 MeV positron annihilation signature, a 0.871 MeV Oxygen capture signature, a 1.262 MeV Carbon capture signature, a 1.635 MeV Nitrogen inelastic scatter signature, a 2.223 MeV Hydrogen capture signature, a 2.313 MeV Nitrogen inelastic scatter signature, a 3.378 MeV Nitrogen inelastic scatter signature, a 3.890 Nitrogen inelastic scatter signature, a 4.438 MeV Carbon inelastic scatter signature, a 4.914 Nitrogen inelastic scatter signature, a 4.945 MeV Carbon capture signature, a 5.105 MeV Nitrogen inelastic scatter signature, a 6.129 MeV Nitrogen inelastic scatter signature, a 6.445 MeV Nitrogen inelastic scatter signature, a 6.916 MeV oxygen inelastic scatter signature, a 7.115 MeV Oxygen inelastic scatter signature, or a 10.829 MeV Nitrogen capture signature.

Templates have been described and several examples given, but other templates may be utilized. For example, a template corresponding to a five gallon sample inside a target may be utilized. The five gallon sample may comprise a fertilizer. The template may comprise eight signatures: a photon response between 70 and 220 keV ($S_1$), a bare neutron detector response ($S_2$), a Cd-covered neutron detector response ($S_3$), a 0.87 MeV peak area ($S_4$), a 2.22 MeV peak area ($S_5$), a 4.43 MeV peak area ($S_6$), a 4.95 MeV peak area ($S_7$), and a 5.11 MeV peak area ($S_8$). The template may store template or signature values corresponding to the eight signatures, for example: $S_1$ is 1,169,247 counts; $S_2$ is 337,237 counts; $S_3$ is 42,191 counts; $S_4$ is 6,187 counts; $S_5$ is 7,713 counts; $S_6$ is 396.2 counts; $S_7$ is 291.4 counts; and $S_8$ is 205.4 counts. The number of counts corresponding to each signature or template value may be determined by exposing the known fertilizer substance in the desired configuration to radiation, detecting the response, and determining signature or template values as described above. In other embodiments, other samples, targets and configurations may be used to generate a template, and any number of such templates may be stored in a library.

While certain examples have been described herein, the disclosure is not limited to only those embodiments described. Other embodiments and variations will be apparent to one of skill in the art, and other embodiments do not necessarily need to realize each advantage described in the disclosure. The invention is defined by the claims.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method comprising:
   exposing a target to radiation, the target comprising an unknown substance having a first composition;
   detecting a response from the target due to the radiation exposure;
   determining one or more signatures based at least in part on the detected response;
   providing a template corresponding to a known substance, the known substance having a second composition; and
   calculating a value indicative of the similarity between the first composition of the unknown substance and the second composition of the known substance by comparing the one or more signatures with the template;
   wherein the one or more signatures comprise at least one of: a 0.511 MeV photon induced positron annihilation signature, a neutron response obtained from an unfiltered neutron detector, a neutron response obtained from a filtered neutron detector, a 0.87 MeV Oxygen capture signature, a 1.262 MeV Carbon capture signature, a 1.64 MeV Nitrogen inelastic scatter signature, a 1.885 MeV Nitrogen capture signature, a 2.184 MeV Oxygen capture signature, a 2.223 MeV Hydrogen capture signature, a 2.31 MeV Nitrogen inelastic scatter signature, a 4.43 MeV Carbon inelastic scatter signature, a 4.945 MeV Carbon, capture signature, a 5.11 MeV Nitrogen inelastic scatter signature, a 6.128 MeV Oxygen inelastic scatter signature, or a 10.83 MeV Nitrogen capture signature.

2. The method of claim 1 wherein the radiation comprises at least one of neutrons and photons.

3. The method of claim 1, wherein the comparison of the signatures of the first unknown composition and the second known composition indicate the substances are the same.

4. The method of claim 1, further comprising:
detecting at least one additional response from the target due to the radiation exposure; and
wherein determining the one or more signatures is based at least in part on the at least one detected additional response.

5. The method of claim 1, wherein the target comprises one of: a car trunk, a back-pack, a suitcase, a piece of luggage, a vehicle, or a bucket.

6. The method of claim 1, further comprising:
providing a library, the library comprising one or more additional templates corresponding to one or more additional known substances; and
calculating one or more additional values indicative of the similarity between the unknown substance and the one or more additional known substances by comparing the one or more signatures with the one or more additional templates.

7. The method of claim 1, further comprising:
providing a library, the library comprising one or more additional templates corresponding to one or more additional configurations of the target and the known substance; and
calculating one or more additional values indicative of the similarity between the unknown substance and the known substance with the one or more additional templates.

8. The method of claim 1, wherein the step of calculating a value indicative of the similarity between the first composition of the unknown substance and the second composition of the known substance comprises calculating a figure-of-merit in accordance with:

$$\zeta = \sum_{i=1}^{N} \alpha_i \frac{(\beta R_i - S_i)^2}{\beta^2 \sigma^2(R_i) + \sigma^2(S_i)} \quad (10)$$

wherein $\zeta$ comprises the figure-of-merit, $R_i$ is the ith determined signature, $S_i$ is a template value corresponding to the ith signature, N is the number of signatures, $\beta$ is a scaling factor, $\sigma^2$ is the variance, and $\alpha_i$ is a normalized weight factor given by:

$$\alpha_i = \frac{w_i}{\sum_{i=1}^{N} w_i} \quad (11)$$

wherein $w_i$ is a positive weight for the ith signature.

9. The method of claim 8, wherein the scaling factor $\beta$ is determined based at least in part on one or more of: a distance to the target, a first length of time that the target is exposed to radiation, a second length of time that the response is detected, or the intensity of the radiation.

10. The method of claim 8, wherein the step of calculating a value indicative of the similarity between the first composition of the unknown substance and the second composition of the known substance comprises determining a confidence level that the first composition is distinct from the second composition in accordance with:

$$\lambda = \frac{\zeta - f_0}{\sigma(\zeta)} \quad (12)$$

wherein $\zeta$ comprises the figure-of-merit, $f_0$ comprises a predetermined threshold value, $\sigma$ is the standard deviation of the figure of merit, given by:

$$\sigma(\zeta) = 2\left[\sum_{i=1}^{N} \alpha_i^2 \frac{(\beta R_i - S_i)^2}{\beta^2 \sigma^2(R_i) + \sigma^2(S_i)}\right]^{1/2} \quad (13)$$

and $\lambda$ comprises the confidence level; and
wherein a greater confidence level $\lambda$ corresponds to a greater likelihood that the first composition is distinct from the second composition.

11. The method of claim 8, wherein the step of calculating a value indicative of the similarity between the first composition of the unknown substance and the second composition of the known substance comprises determining a confidence level that the first composition is similar to the second composition in accordance with:

$$\lambda = \frac{f_0 - \zeta}{\sigma(\zeta)} \quad (14)$$

wherein $\zeta$ comprises the figure-of-merit, $f_0$ comprises a predetermined threshold value, $\sigma$ is the standard deviation of the figure of merit, given by:

$$\sigma(\zeta) = 2\left[\sum_{i=1}^{N} \alpha_i^2 \frac{(\beta R_i - S_i)^2}{\beta^2 \sigma^2(R_i) + \sigma^2(S_i)}\right]^{1/2} \quad (15)$$

and $\lambda$ comprises the confidence level; and
wherein a greater confidence level $\lambda$ corresponds to a greater likelihood that the first composition is similar to the second composition.

12. The method of claim 1, wherein the template corresponds to an explosive substance, and wherein the value indicative of the similarity between the first composition of the unknown substance and the second composition of the known substance corresponds to a likelihood that the target comprises an explosive.

13. The method of claim 12, further comprising:
determining whether the target is likely to comprise an explosive based at least in part on the value indicative of the similarity between the first composition and the second composition; and
generating an alert when it is determined that the target is likely to comprise an explosive substance.

14. A method comprising:
exposing a target to radiation, the target comprising an unknown substance having a first composition;
detecting a response from the target due to the radiation exposure;
determining one or more signatures based at least in part on the detected response;
providing a template corresponding to a known substance, the known substance having a second composition; and
calculating a value indicative of the similarity between the first composition of the unknown substance and the second composition of the known substance by comparing the one or more signatures with the template;
wherein the step of calculating a value indicative of the similarity between the first composition of the unknown substance and the second composition of the known substance comprises calculating figure-of-merit in accordance with:

$$\zeta = \sum_{i=1}^{N} \alpha_i \frac{(\beta R_i - S_i)^2}{\beta^2 \sigma^2(R_i) + \sigma^2(S_i)} \quad (10)$$

wherein $\zeta$ comprises the figure-of-merit, $R_i$ is the ith determined signature, $S_i$ is a template value corresponding to the ith signature, N is the number of signatures, $\beta$ is a scaling factor, $\sigma^2$ is the variance, and $\alpha_i$ is a normalized weight factor given by:

$$\alpha_i = \frac{w_i}{\sum_{i=1}^{N} w_i} \quad (11)$$

wherein $w_i$ is a positive weight for the ith signature; and
wherein the step of calculating a value indicative of the similarity between the first composition of the unknown substance and the second composition of the known substance comprises determining a confidence level that the first composition is distinct from the second composition in accordance with:

$$\lambda = \frac{\zeta - f_0}{\sigma(\zeta)} \quad (12)$$

wherein $\zeta$ comprises the figure-of-merit, $f_0$ comprises a predetermined threshold value, $\sigma$ is the standard deviation of the figure of merit, given by:

$$\sigma(\zeta) = 2 \left[ \sum_{i=1}^{N} \alpha_i^2 \frac{(\beta R_i - S_i)^2}{\beta^2 \sigma^2(R_i) + \sigma^2(S_i)} \right]^{1/2} \quad (13)$$

and $\lambda$ comprises the confidence level; and
wherein a greater confidence level $\lambda$ corresponds to a greater likelihood that the first composition is distinct from the second composition; or
wherein the step of calculating a value indicative of the similarity between the first composition of the unknown substance and the second composition of the known substance comprises determining a confidence that the first composition is similar to the second composition in accordance with:

$$\lambda = \frac{f_0 - \zeta}{\sigma(\zeta)} \quad (14)$$

wherein $\zeta$ comprises the figure-of-merit, $f_0$ comprises a predetermined threshold value, $\sigma$ is the standard deviation of the figure of merit, given by:

$$\sigma(\zeta) = 2 \left[ \sum_{i=1}^{N} \alpha_i^2 \frac{(\beta R_i - S_i)^2}{\beta^2 \sigma^2(R_i) + \sigma^2(S_i)} \right]^{1/2} \quad (15)$$

and $\lambda$ comprises the confidence level; and
wherein a greater confidence level $\lambda$ corresponds to a greater likelihood that the first composition is similar to the second composition.

15. The method of claim 14, wherein the one or more signatures comprise at least one of:
a 0.511 MeV photon induced positron annihilation signature, a neutron response obtained from an unfiltered neutron detector, a neutron response obtained from a filtered neutron detector, a 0.87 MeV Oxygen capture signature, a 1.262 MeV Carbon capture signature, a 1.64 MeV Nitrogen inelastic scatter signature, a 1.885 MeV Nitrogen capture signature, a 2.184 MeV Oxygen capture signature, a 2.223 MeV Hydrogen capture signature, a 2.31 MeV Nitrogen inelastic scatter signature, a 4.43 MeV Carbon inelastic scatter signature, a 4.945 MeV Carbon capture signature, a 5.11 MeV Nitrogen inelastic scatter signature, a 6.128 MeV Oxygen inelastic scatter signature, or a 10.83 MeV Nitrogen capture signature.

* * * * *